(12) United States Patent
Francke et al.

(10) Patent No.: US 6,518,578 B1
(45) Date of Patent: Feb. 11, 2003

(54) METHOD FOR DETECTING IONIZING RADIATION, A RADIATION DETECTOR AND AN APPARATUS FOR USE IN PLANAR BEAM RADIOGRAPHY

(75) Inventors: Tom Francke, Sollentuna (SE); Vladimir Peskov, Stockholm (SE)

(73) Assignee: XCounter AB, Danderyd (SE)

( * ) Notice: Subject to any disclaimer, the term of this patent is extended or adjusted under 35 U.S.C. 154(b) by 0 days.

(21) Appl. No.: 09/443,321

(22) Filed: Nov. 19, 1999

(30) Foreign Application Priority Data

Apr. 14, 1999 (SE) ............................................. 9901326

(51) Int. Cl.[7] ............................................. G01T 1/185
(52) U.S. Cl. ...................... 250/374; 250/385.1; 378/51; 378/148; 378/149
(58) Field of Search .............................. 250/374, 385.1; 378/51, 148, 149

(56) References Cited

U.S. PATENT DOCUMENTS 3,920,984 A * 11/1975 Kirkendall et al. ........... 378/49
5,959,302 A * 9/1999 Charpak .................. 250/385.1

FOREIGN PATENT DOCUMENTS

| EP | A1 0810631 | 12/1997 |
|---|---|---|
| WO | 9923859 | 5/1999 |

* cited by examiner

Primary Examiner—Constantine Hannaher
Assistant Examiner—Shun Lee
(74) Attorney, Agent, or Firm—Birch, Stewart, Kolasch & Birch, LLP

(57) ABSTRACT

A method for detecting ionizing radiation, a detector (64) for detection of ionizing radiation, and an apparatus for use in planar beam radiography, including the detector. The detector includes: a chamber filled with an ionizable gas; first and second electrode arrangements (2, 1, 18, 19) provided in the chamber with a space between them, the space including a conversion volume (13); an electron avalanche amplification unit (17) arranged in the chamber; and, at least one arrangement of read-out elements (15) for detection of electron avalanches. Radiation enters the conversion volume between the first and second electrode arrangements via a radiation entrance. The distance between the first and second electrode arrangements is selected to achieve discrimination of fluorescent photons and/or long-range electrons, in order to achieve improved position resolution.

46 Claims, 5 Drawing Sheets

METHOD FOR DETECTING IONIZING RADIATION, A RADIATION DETECTOR AND AN APPARATUS FOR USE IN PLANAR BEAM RADIOGRAPHY

FIELD OF THE INVENTION

The invention relates to a detector for detection of ionizing radiation to an apparatus for use in planar beam radiography and to a method for detecting ionizing radiation.

BACKGROUND OF THE INVENTION AND RELATED ART

A detector and an apparatus of the kind mentioned above are described in the copending U.S. application Ser. No. 08/969,554 and in the copending SE applications SE 9901327-8, SE 9901324-5, SE 9901325-2 and SE 9901562-0, which are incorporated herein by reference. Another detector and apparatus of the kind mentioned above is disclosed in EP-A1-0 810 631.

Gaseous detectors are a viable alternative to solid state detectors at photon energies <10 keV. The main advantages with gaseous detectors are that they are cheap to manufacture compared to solid state detectors, and they can employ gas multiplication to strongly (several orders of magnitude) amplify the signal amplitudes. However, at energies >10 keV the gaseous detectors are less attractive because the stopping power of the gas decreases rapidly with increased photon energy. This results in a spoiled position resolution due to extended tracks of electrons (long-range electons), which are created as a result of the X-ray absorption.

SUMMARY OF THE INVENTION

The present invention is directed to a detector for detection of ionizing radiation, which can employ avalanche amplification, and provides improved position resolution, and can operate in a wider energy range of incoming radiation than prior art detectors.

This and other objects are attained by a detector for detection of ionizing radiation, comprising a chamber filled with an ionizable gas, first and second electrode arrangements, provided in said chamber with a space between them, said space including a conversion and drift volume, an electron avalanche amplification unit arranged in the chamber, and wherein said electron avalanche amplification unit includes at least one avalanche cathode and at least one avalanche anode between which a voltage is to be applied for creation of at least one electric field for avalanche amplification, and the distance between the first and second electrode arrangements being smaller than an attenuation length of fluorescent photons present in the at least one electric field for avalanche amplification.

The above detector can further be given a length, in the direction of the incoming radiation, for achieving a desired stopping power, which makes it possible to detect a major portion of the incoming radiation.

In the above detector electrons that are released by interactions between photons and gas atoms can be extracted in a direction essentially perpendicular to the incident radiation to obtain a very high position resolution.

The above detector, which can also operate at high X-ray fluxes without performance degradation, has a long lifetime.

The above detector can also effectively detect any kind of radiation, including electromagnetic radiation as well as incident particles, including elementary particles.

The above detector is also simple and cheap to manufacture.

The present invention is also directed to an apparatus for use in planar beam radiography, comprising at least one one-dimensional detector for detection of ionizing radiation, which can employ avalanche amplification, and provides improved position resolution, and can operate in a wider energy range of incoming radiation than prior art detectors, and which can be manufactured in a simple and cost effective way.

This and other objects are attained by an apparatus for use in planar beam radiography, comprising an X-ray source, a substantially planar beam unit for forming a substantially planar X-ray beam positioned between said X-ray source and an object to be imaged, and the distance between the first and second electrode arrangements being smaller than a length of electron tracks of long-range electrons released from gas atoms present in the at least one electric field for avalanche amplification and/or ions as a result of interaction with X-ray photons. The above apparatus can be used in planar beam radiography, e.g. slit or scan radiography, where an object to be imaged only needs to be irradiated with a low dose of X-ray photons, while an image of high quality is obtained.

The above apparatus can also be used in planar beam radiography, in which a major fraction of the X-ray photons incident on the detector can be detected, for further counting or integration in order to obtain a value for each pixel of the image.

The above apparatus can also be used in planar beam radiography, in which image noise caused by radiation scattered in an object to be examined is strongly reduced.

The above apparatus can also be used in planar beam radiography, in which image noise caused by the spread of X-ray energy spectrum is reduced.

The above apparatus can also be used in planar beam radiography, including a detector which can operate at high X-ray fluxes without a performance degradation and has a long lifetime.

The present invention is also directed to a method for detection of ionizing radiation, which employs avalanche amplification, provides improved position resolution, and is efficient in a wider energy range of incoming radiation than prior art methods, and which can be implemented in a simple and cost effective way.

This and other objects are attained by a method for detecting ionizing radiation, comprising the steps of permitting the radiation to interact with gas atoms in a gas filled conversion and drift volume, to create released electrons, subjecting the electrons to an electric field in the conversion and drift volume, the electric field being substantially perpendicular to the direction of the radiation, causing electron avalanches by using the electric field to force the electrons to enter one of a plurality of regions, each with a concentrated electric field, detecting the electron avalanches using read-out elements, and discriminating fluorescent photons emitted in said radiation step.

In the above method, it possible to detect a major portion of the incoming radiation.

In the above method, electrons released by interactions between photons and gas atoms are extracted in a direction perpendicular to the incident radiation to obtain a very high position resolution.

The above method can also be used at high X-ray fluxes.

Further scope of applicability of the present invention will become apparent from the detailed description given hereinafter. However; it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
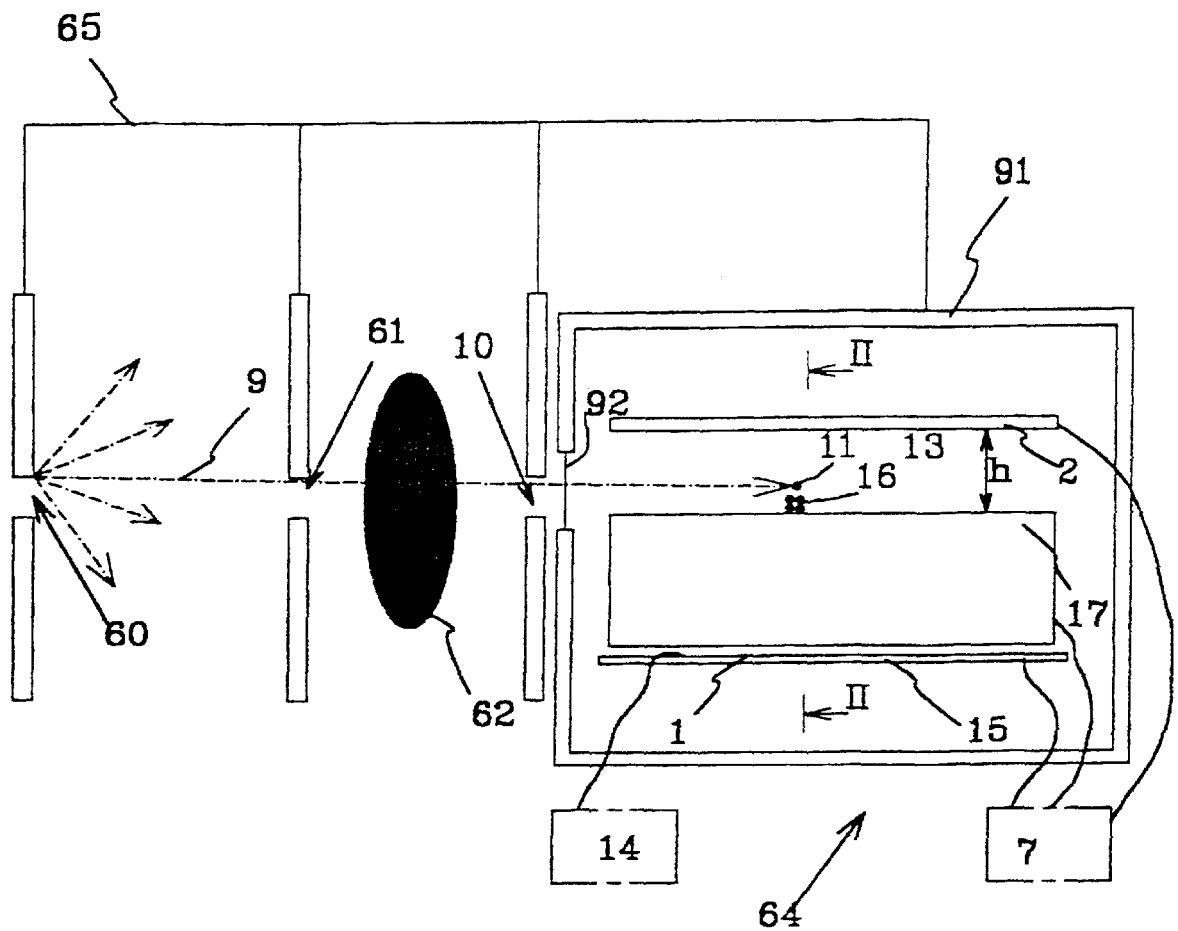
FIG. 1 illustrates schematically, in an overall view, an apparatus for planar beam radiography, according to a general embodiment of the invention.

FIG. 1 is a sectional view in a plane orthogonal to the plane of a planar X-ray beam 9 of an apparatus for planar beam radiography, according to the invention. The apparatus includes an X-ray source 60, which in combination with a first thin collimator window 61 produces a planar fan-shaped X-ray beam 9, for irradiation of an object 62 to be imaged. The first thin collimator window 61 can be replaced by other means for forming an essentially planar X-ray beam, such as an X-ray diffraction mirror or an X-ray lens etc. The beam transmitted through the object 62 enters a detector 64. Optionally a thin slit or second collimator window 10, which is aligned with the X-ray beam forms the entrance for the X-ray beam 9 to the detector 64. A major fraction of the incident X-ray photons are detected in the detector 64, which includes a conversion and drift volume 13, and an electron avalanche amplification unit 17, and is oriented so that the X-ray photons enter sideways between two electrode arrangements 1, 2, between which an electric field for drift of electrons and ions in the conversion and drift volume 13 is created.

In this application, the planar X-ray beam is a beam that is collimated, e.g. by collimator 61.

The detector 64 and its operation will be further described below. The X-ray source 60, the first thin collimator window 61, the optional collimator window 10 and the detector 64 are connected and fixed in relation to each other by for example a frame or support 65. The so formed apparatus for radiography can be moved as a unit to scan an object, which is to be examined. In a single detector system, as shown in FIG. 1, scanning is achieved by a pivoting movement, rotating the unit around an axis through for example the X-ray source 60 or the detector 64. The location of the axis depends on the application or use of the apparatus, and possibly the axis can also run through the object 62, in some applications. Scanning can also be achieved by a translative movement where the detector and the collimator are moved, or the object to be imaged is moved. In a multiline configuration, where a number of detectors are stacked, as will be explained later, in connection with FIGS. 5 and 6, the scanning can be done in various ways. In many cases it may be advantageous if the apparatus for radiography is fixed and the object to be imaged is moved.

The detector 64 includes a first drift electrode arrangement being a cathode plate 2 and a second drift electrode arrangement being an anode plate 1. They are mutually parallel and the space in between includes a thin gas-filled gap or region 13, termed a conversion and drift volume, and an electron avalanche amplification unit 17. Alternatively the plates are non-parallel. A voltage is applied between the anode plate 1 and the cathode plate 2, and one or several voltages is (are) applied to the electron avalanche amplification unit 17. This results in a drift field causing drift of electrons and ions in the gap 13, and electron avalanche amplification fields in the electron avalanche amplification unit 17. In connection with the anode plate 1 is an arrangement 15 of read-out elements for detection of electron avalanches provided. Preferably the arrangement of read-out elements 15 also constitutes the anode electrode. Alternatively the arrangement 15 of read-out elements can be formed in connection with the cathode plate 2 or the electron avalanche amplification unit 17. The arrangement 15 of read-out elements can also be formed on the anode or cathode plate separated from the anode or cathode electrode by a dielectric layer or substrate. In this case it is necessary that the anode or cathode electrode is semi-transparent to induced pulses, e.g. formed as strips or pads. In connection with FIGS. 3 and 4 below different possible arrangements 15 of read-out elements are shown.

As seen, the X-rays to be detected are incident sideways on the detector and enters the conversion and drift volume 13 between the cathode plate 2 and the anode plate 1. The X-rays enter the detector preferably in a direction parallel to the cathode plate 2 and the anode plate 1, and may enter the detector through a thin slit or collimator window 10. In this way the detector can easily be made with an interaction path long enough to allow a major fraction of the incident X-ray photons to interact and be detected.

The gap or region 13 is filled with a gas, which can be a mixture of for example 90% krypton and 10% carbon dioxide or a mixture of for example 80% xenon and 20% carbon dioxide. The gas can be under pressure, preferably in a range 1–20 atm. Therefore, the detector includes a gas tight housing 91 with a slit entrance window 92, through which the X-ray beam 9 enters the detector. The window is made of a material, which is transparent for the radiation, e.g. Mylar®, or a thin aluminum foil. This is a particularly advantageous additional effect of the invention, detecting sideways incident beams in a gaseous avalanche chamber 64, compared to previously used gaseous avalanche chambers, which were designed for radiation incident perpendicular to the anode and cathode plates, requiring a window covering a large area. The window can in this way be made thinner, thus reducing the number of X-ray photons absorbed in the window.

In operation, the incident X-rays 9 enter the detector through the optional thin slit or collimator window 10, if present, and between the cathode plate 2 and an upper surface or electrode arrangement of the electron avalanche amplification unit 17, preferably in a center plane between these. The incident X-rays 9 then travel through the gas volume in a direction preferably parallel with the upper surface of the electron avalanche amplification unit 17.

When an X-ray photon hits and interacts with an atom of noble gas, a hole in the K or L shell is created, and a photoelectron having the kinetic energy $E=h\nu-E_{shell}$ is released. The released photoelectron usually is a long-range electron. Such an electron has a rather long mean free path.

A long-range electron is an electron with high kinetic energy (up to 30 keV), which will travel a relatively long path (1–2 mm, at 1 atm.) before it becomes retarded and stopped (loses its kinetic energy) in the gas.

When the hole in the K or L shell is filled by an electron jumping from a higher level, an Auger electron and/or a fluorescent photon will appear. An Auger electron is a short-range electron.

A short-range electron is an electron with low kinetic energy (1.5 keV for krypton, 4 kev for xenon), which will travel a relatively short path (0.05–0.1 mm, at 1 atm.) before it becomes stopped (loses its kinetic energy) in the gas.

Therefore, during one interaction of an X-ray photon with a gas atom, e.g. Kr or Xe, several electrons will in almost all cases be released simultaneously; both long-range and short-range electrons. Further, fluorescent photons can also be emitted during the interaction.

Both long-range and short-range electrons produce electron tracks, which are tracks of secondary ionized electrons produced by the electrons during the travel in the gas. When an electron has high kinetic energy (20–30 keV), the number of released electrons (secondary ionized electrons) is low per path unit. For electrons having low kinetic energy (typically 1–4 keV) the number of released electrons (secondary ionized electrons) per path unit is higher.

As mentioned, the typical track length of a long-range electron is about 1–2 mm at atmospheric pressure. This is therefore a physical limit for the position resolution. The fluorescent photons emitted also create ionization, as mentioned above. This ionization takes place far away from the primary interaction with a typical attenuation length of 1.5–250 mm at atmospheric pressure. This ionization also deteriorates the position resolution and creates background noise.

By detecting all electrons and fluorescent photons, which is done at present in all existing gas detectors, position resolution is drastically deteriorated at photon energies >10 keV. In for example EP-A1-0 810 631, mentioned above, all ionizations created in the conversion and drift volume are detected, since the gap has a large height.

Typically between a few hundred and thousand secondary ionization electron-ion pairs are produced from a 20 keV X-ray photon in this process. The secondary ionization electrons 16 (together with the primary ionization electron 11) will drift towards the electron avalanche amplification unit 17 due to the electric field in the conversion and drift volume 13. When the electrons enter regions of focused field lines of the electron avalanche amplification unit 17 they will undergo avalanche amplification, which will be described further below.

The movements of the avalanche electrons and ions induce electrical signals in the arrangement 15 of read-out elements for detection of electron avalanches. Those signals are picked up in connection with the electron avalanche amplification unit 17, the cathode plate 2 or the anode plate 1, or a combination of two or more of said locations. The signals are further amplified and processed by readout circuitry 14 to obtain accurate measurements of the X-ray photon interaction points, and optionally the X-ray photon energies.

In order to improve the position resolution, the detector according to the invention is provided with a conversion and drift volume, having a height h being smaller than the attenuation length of the fluorescent photons. As a result a great number of fluorescent photons will not cause ionization in the conversion and drift volume.

In order to further improve the position resolution, the detector according to the invention is provided with a conversion and drift volume, having a height h being smaller than the length of the electron tracks of the long-range electrons. This results in that a greater number of fluorescent photons and a great number of long-range electrons will not undergo full energy loss in the conversion and drift volume.

The height h can preferably be selected so that a major portion of the fluorescent photons and/or long-range electrons are discriminated. That is, a major portion of the fluorescent photons will not cause ionization in the conversion and drift gap and/or a major portion of the long-range electrons will not be retarded to the energy level where they produce a high number of secondary ionized electrons per path unit within the conversion and drift gap. The distance between the first and second electrode arrangement determines the number of discriminated fluorescent photons and/or long-range electrons at a specific electric field strength and for a specific gas.

In order to yet further improve the position resolution, the detector according to the invention is provided with a conversion and drift volume, having a height h being essentially a few times the length of the electron tracks of the short-range electrons ( e.g. 1–5 times the length of the electron tracks of the short-range electrons). This results in that a greater number of fluorescent photons and a greater number of long-range electrons will not undergo full energy loss in the conversion and drift volume. Of course the height h can be smaller than the length of the electron tracks of the short-range electrons, but then the efficiency will go down since also short-range electrons will be discriminated.

By such geometrical discrimination of long-range electrons and fluorescent photons, among the detected electron avalanches, a major amount of the detected avalanches are caused by short-range electrons, than without the discrimination. This improves the position resolution, since the long-range electrons and fluorescent photons cause avalanches far from the interaction point. The more long-range electrons and fluorescent photons that are discriminated, the higher the ratio between detected avalanches caused by short-range electrons and detected avalanches caused by long range electrons and fluorescent photons will be. A higher position resolution is thereby achieved.

Also electronic discrimination can be used to improve the position resolution. As mentioned, a short-range electron produces a high number of secondary ionized electrons per path unit, and an electron having high energy produces a low number of secondary ionized electrons per path unit. Therefore the avalanche amplified signal on each individual readout strip or pad is high for a short-range electron, while it is low for a long-range electron during a major part of its travel. By providing the read out electronics with a threshold function, the low signals from the long-range electrons can be discriminated.

The electrical field strength in the drift volume and in the volume of avalanche amplification are dependent on the type of gas and the pressure in said volume. The factor of amplification is in the range of one to 10 millions in the volume of avalanche amplification.

In FIGS. 2a–2e are shown different embodiments of the invention where different avalanche amplification units 17 are used.

Figure 2A:
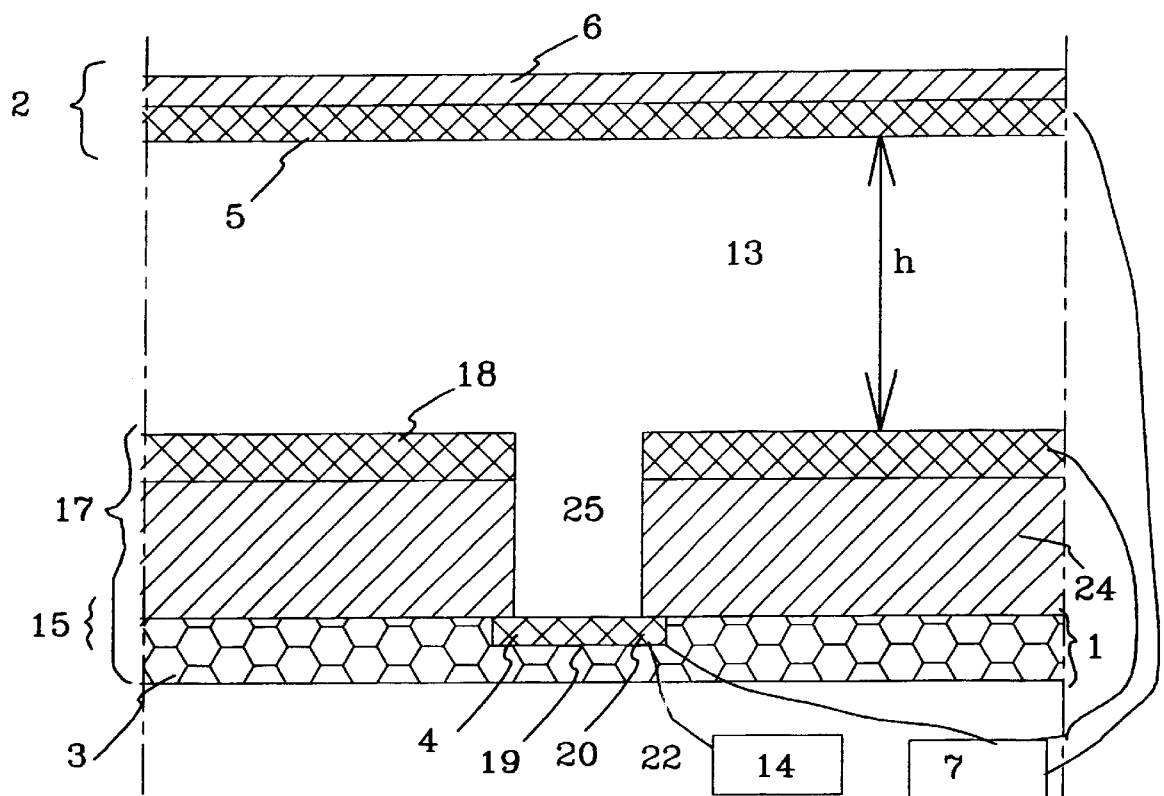
FIG. 2a is a schematic, partly enlarged, cross sectional view, taken at II—II in FIG. 1, of a detector according to a first specific embodiment of the invention.

FIG. 2a shows a schematic, partly enlarged, cross sectional view, taken at II—II in FIG. 1, of a detector according to a first specific embodiment of the invention. As seen, the cathode plate 2 comprises a dielectric substrate 6 and a conductive layer 5 being a cathode electrode. The anode 1 comprises a dielectric substrate 3 and a conductive layer 4 being an anode electrode. Between the gap 13 and the anode 1 an electron avalanche amplification unit 17 is arranged. This amplification unit 17 includes an avalanche amplification cathode 18 and an avalanche amplification anode 19, separated by a dielectric 24. This could be a gas or a solid substrate 24 carrying the cathode 18 and the anode 19, as shown in the figure. As seen, the anode electrodes 4 and 19 are formed by the same conductive element. Between the cathode 18 and the anode 19 a voltage is applied by means of a DC power supply 7 for creation of a very strong electric field in an avalanche amplification region 25. The avalanche region 25 is formed in a region between and around the edges of the avalanche cathode 18 which are facing each other, where a concentrated electric field will occur due to the applied voltages. The DC power supply 7 is also connected with the cathode electrode 5 and the anode electrode 4 (19). The voltages applied are selected so that a weaker electric field, drift field, is created over the gap 13. Electrons (primary and secondary electrons) released by interaction in the conversion and drift volume 13 will drift, due to the drift field, towards the amplification unit 17. They will enter the very strong avalanche amplification fields and be accelerated. The accelerated electrons 11, 16 will interact with other gas atoms in the region 25 causing further electron-ion pairs to be produced. Those produced electrons will also be accelerated in the field, and will interact with new gas atoms, causing further electron-ion pairs to be produced. This process continues during the travel of the electrons in the avalanche region towards the anode 19 and an electron avalanche is formed. After leaving the avalanche region the electrons will drift towards the anode 19. The electron avalanche may continue up to the anode 19 if the electric field is strong enough.

The avalanche region 25 is formed by an opening or channel in the cathode 18 and the dielectric substrate 24, if present. The opening or channel can be circular, seen from above, or continuous, longitudinal extending between two edges of the substrate 24, if present, and the cathode 18. In the case the openings or channels are circular when seen from above they are arranged in rows, each row of openings or channels including a plurality of circular openings or channels. A plurality of longitudinal openings or channels or rows of circular channels are formed beside each other, parallel with each other or with the incident X-rays. Alternatively, the circular openings or channels can be arranged in other patterns.

The anode electrodes 4, 19 also forms readout elements 20 in the form of strips provided in connection with the openings or channels forming the avalanche regions 25. Preferably one strip is arranged for each opening or channel or row of openings or channels. The strips could be divided into sections along its length, where one section could be provided for each circular opening or channel or for a plurality of openings or channels, in the form of pads. The strips and the sections, if present, are electrically insulated from each other. Each detector electrode element i.e. strip or section is preferably separately connected to processing electronics 14. Alternatively the read-out elements can be located on the back side of the substrate (opposite the side of the anode electrodes 4, 19). In this case it is necessary that the anode electrodes 4, 19 are semi-transparent to induced pulses, e.g. in the form of strips or pads. In connection with FIGS. 3 and 4 below different possible arrangements 15 of read-out elements are shown.

As an example the longitudinal channels can have a width in the range 0.01–1 mm, the circular channels can have a diameter of the circle in the range 0.01–1 mm, and the thickness of the dielectric 24 (separation between the avalanche cathode 18 and anode 19) is in the range 0.01–1 mm.

Alternatively the conductive layers 5, 4 can be replaced by a resistive carrier of e.g. silicon monoxide, conductive glass or diamond, with the dielectric substrates 3, 6 replaced by a conductive layer. In such a case a dielectric layer or carrier is preferably arranged between the conductive layer and the readout elements 20 when they are located in connection with a drift electrode arrangement.

Figure 2B:
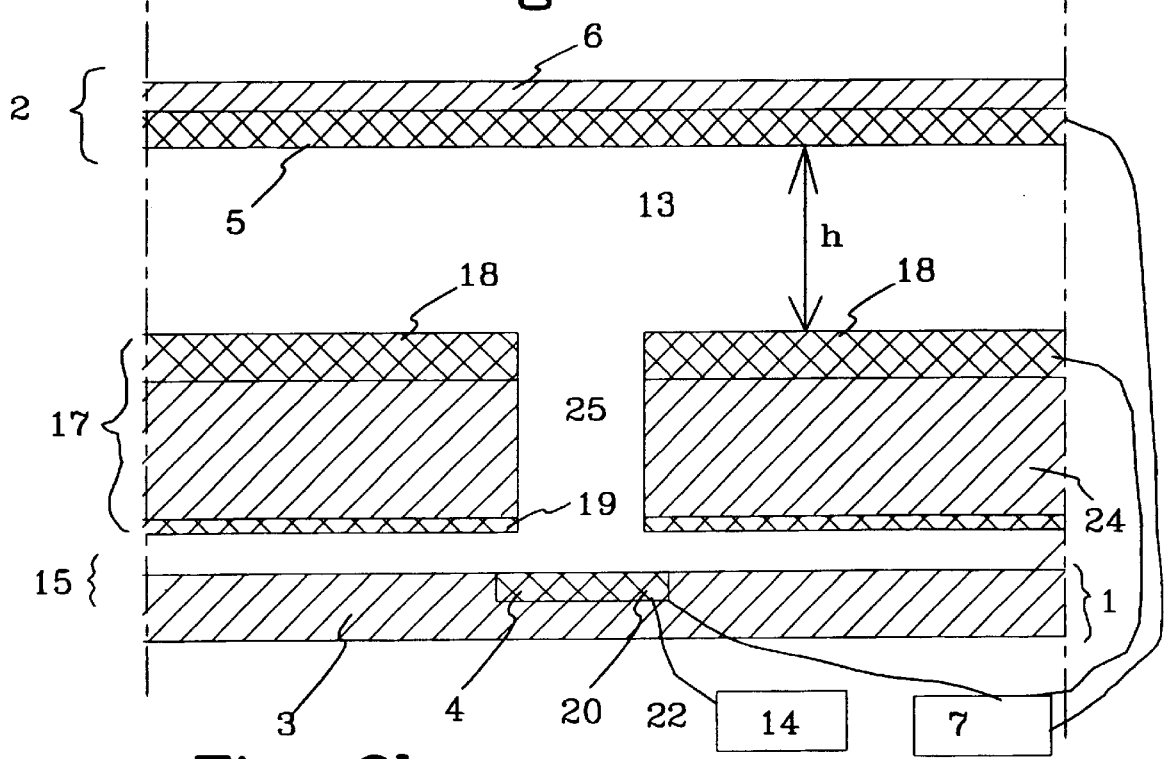
FIG. 2b is a schematic, partly enlarged, cross sectional view, taken at II—II in FIG. 1, of a detector according to a second specific embodiment of the invention.

FIG. 2b shows a schematic, partly enlarged, cross sectional view, taken at II—II in FIG. 1, of a detector according to a second specific embodiment of the invention. This embodiment differs from the embodiment according to FIG. 2a in that the anode electrodes 4 and 19 are formed by different conductive elements, being spaced by a dielectric, which could be solid or a gas, and that the openings or channels also are formed in the avalanche anode electrode 19. The avalanche amplification anode 19 is connected to the DC power supply 7. In the case the dielectric between the anode electrodes 4 and 19 is solid, it includes openings or channels through the dielectric, the openings or channels essentially corresponding the openings or channels forming the avalanche regions 25. An electric field is created between the anode electrodes 4 and 19. This field could be a drift field, i.e. a weaker field, or an avalanche amplification field, i.e. a very strong electric field. In connection with FIGS. 3 and 4 below different possible arrangements 15 of read-out elements are shown.

Figure 2C:
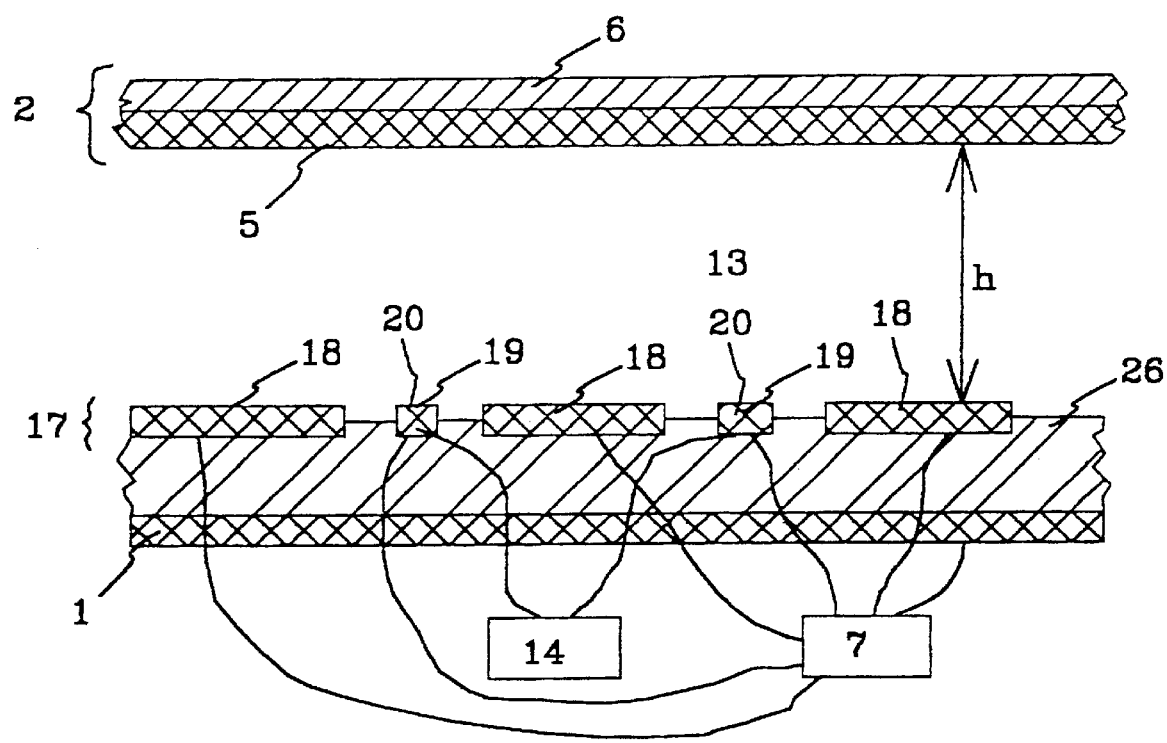
FIG. 2c is a schematic, partly enlarged, cross sectional view, taken at II—II in FIG. 1, of a detector according to a third specific embodiment of the invention.

FIG. 2c shows a schematic, partly enlarged, cross sectional view, taken at II—II in FIG. 1, of a detector according to a third specific embodiment of the invention. The detector includes a cathode 2, as described above, an anode 1, and an avalanche amplification unit 17. A gap 13 being a conversion and drift volume is provided between the cathode 2 and the avalanche amplification unit 17. The gap 13 is gas filled and the cathode 2 is formed as described above. The drift anode 1 is provided on a back surface of a dielectric substrate 26, e.g. a glass substrate. On the front surface of the substrate 26, avalanche amplification cathode 18 and anode 19 strips are alternately provided. The cathode 18 and anode 19 strips are conductive strips, and are connected to the DC power supply 7, or creation of a concentrated electric field, i.e. an avalanche amplification field in each region between a cathode strip 18 and an a node 19 strip. The anode 1 and cathode 2 are also connected to the DC power supply 7. The voltages applied are selected so that a weaker electric field, drift field, is created over the gap 13. Alternatively the dielectric substrate 26 can be replaced by a gas. FIG. 2a illustrates that the avalanche amplification cathode 18, the avalanche amplification anode 19, and the dielectric 24 are supported by anode plate 1. In an arrangement such as the one shown in FIG. 2b, it may be necessary to provide supports for the avalanche amplification cathode 18, the avalanche amplification anode 19, and the dielectric 24, in order to maintain the space between the avalanche amplification anode 19 and the cathode 1. Such supports may be any type of structure known to one of ordinary skill in the art, such as brackets, pedestals, or any other variation, which would maintain the space between the avalanche amplification anode 19 and the anode plate 1.

Preferably the avalanche anode strips 19 also forms the read out elements 20, and are then connected to the processing electronics 14. The avalanche cathode strips 18 could instead form the read out elements, or together with the anode strips 19. As an alternative the anode electrode 1 can be constituted of strips, which can be segmented and insulated from each other. Those strips could then form the read out elements alone or together with the anode and/or cathode strips. The strips acting as anode/cathode and read out elements are connected to the DC power supply 7 and the processing electronics 14, with appropriate couplings for separation. In a further alternative the cathode strips 18 and/or the anode strips 19 are formed by an underlying conductive layer covered by a resistive top layer, made of e.g. silicon monoxide, conductive glass or diamond. This reduces the power of possible sparks, which could appear in the gas due to the strong electric field. In a further alternative of an arrangement of read out strips the read out strips 20 are arranged under and parallel with the avalanche anode strips 19. The read out strips 20 are then made a little wider than the avalanche anode strips 19. If they are located under the anode 1 it is necessary that the anode electrode is semi-transparent to induced pulses, e.g. in the form of strips or pads. In yet another alternative the anode 1 can be omitted since the necessary electric fields can be created by means of the cathode electrodes 5, 18 and the anode electrodes 19.

As an example, the glass substrate is about 0.1–5 mm thick. Further, the conductive cathode strip has a width of about 20–1000 $\mu$m and the conductive anode strip has a width of about 10–200 $\mu$m, with a pitch of about 50–2000 $\mu$m. Cathodes and anodes can be divided into segments along their extension.

In operation, X-ray photons enter the space 13 in the detector of FIG. 2c essentially parallel with the avalanche cathode 18 and anode 19 strips. In the conversion and drift volume 13 the incident X-ray photons are absorbed and electron-ion pairs are produced as described above. A cloud of primary and secondary electrons, being the result of interactions caused by one X-ray photon drift towards the avalanche amplification unit 17. The electrons will enter the very strong electric field in the gas filled region between an anode strip and a cathode strip, which is an avalanche amplification region. In the strong electric field the electrons initiate electron avalanches. As a result the number of electrons which is collected on the anode strips is of a few orders of magnitude higher than the number of primary and secondary electrons (so called gas multiplication). One advantage with this embodiment is that each electron avalanche only induces a signal mostly on one anode element or essentially on one detector electrode element. The position resolution in one coordinate is therefore determined by the pitch.

In the embodiments described above different locations for the detector electrode arrangements have been described. There are many variations, e.g. more than one detector electrode arrangement can be provided, adjacent to each other with different directions of the strips or segments, or at separate locations.

Figure 3:
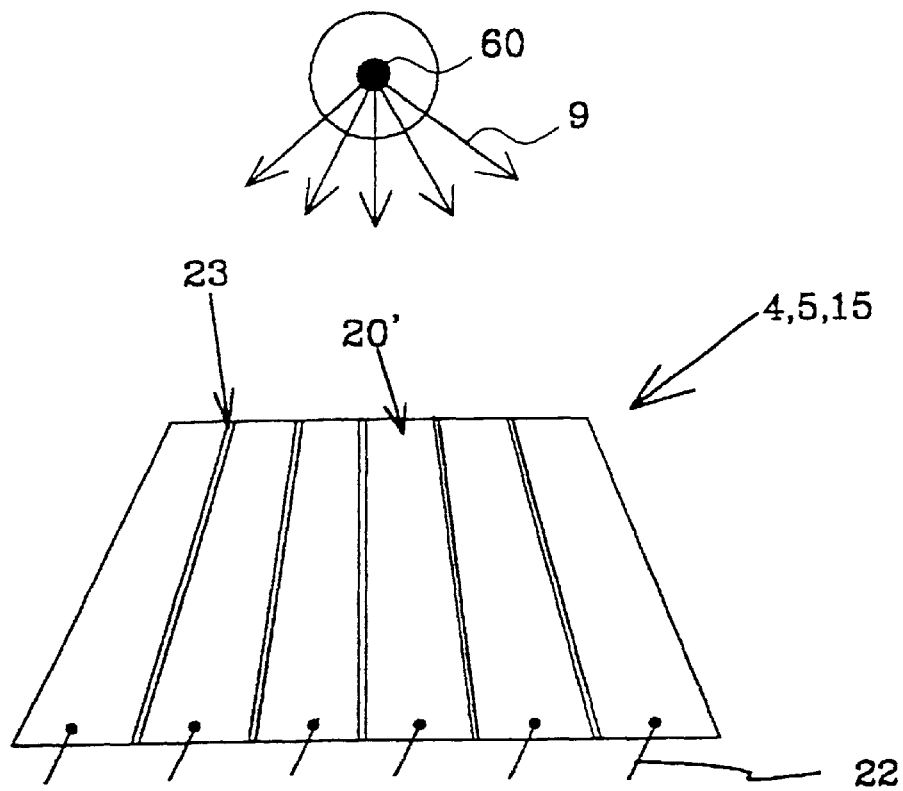
FIG. 3 is a schematic view of an embodiment of an X-ray source and an electrode formed by readout strips.

Referring to FIG. 3, a possible configuration of a detector electrode arrangement 4, 5, 15, is shown. The electrode arrangement 4, 5, 15 is formed by strips 20', and can also act as anode or cathode electrode as well as detector electrode. A number of strips 20' are placed side by side, and extend in directions parallel to the direction of an incident X-ray photon at each location. The strips are formed on a substrate, electrically insulated from each other, by leaving a space 23 between them. The strips may be formed by photolithographic methods or electroforming, etc. The space 23 and the width of the strips 20' are adjusted to the specific detector in order to obtain the desired (optimal) resolution. In for example the embodiment of FIG. 2a the strips 20' should be placed under the openings or channels or rows of openings or channels and have essentially the same width as the openings or channels, or somewhat wider. This is true for both the case that the detector electrode arrangement is located separated from the anode electrode 4 and for the case the detector electrode arrangement also constitutes the anode electrode 4.

Each strip 20' is connected to the processing electronics 14 by means of a separate signal conductor 22, where the signals from each strip preferably are processed separately. Where an anode or cathode electrode constitutes the detector electrode, the signal conductors 22 also connects the respective strip to the high voltage DC power supply 7, with appropriate couplings for separation.

As seen from the figure, the strips 20' and the spacings 23 aim at the X-ray source 60, and the strips grow broader along the direction of incoming X-ray photons. This configuration provides compensation for parallax errors.

The electrode arrangement shown in FIG. 3 is preferably the anode, but alternatively or conjointly the cathode can have the described construction. In the case the detector electrode arrangement 15 is a separate arrangement, the anode electrode 4 can be formed as a unitary electrode without strips and spacings. The same is valid for the cathode electrode or the anode electrode, respectively, when only the other thereof comprises the detector electrode arrangement. However, if the detector electrode arrangement is located on a substrate on the opposite side to a cathode or anode electrode, the anode or cathode electrode should be semi-transparent to induced pulses, e.g. formed as strips or pads.

Figure 4:
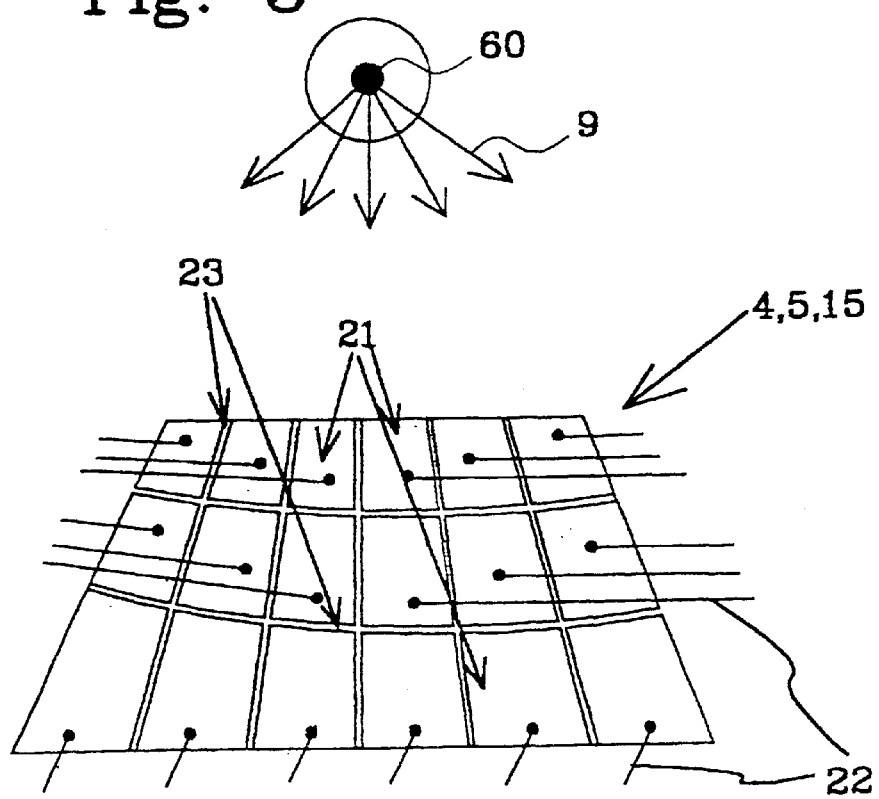
FIG. 4 is a schematic top view of a second embodiment of an X-ray source and an electrode formed by segmented readout strips.

In FIG. 4, an alternative configuration of an electrode is shown. The strips have been divided into segments 21, electrically insulated from each other. Preferably a small spacing extending perpendicular to the incident X-rays is provided between each segment 21 of respective strip. Each segment is connected to the processing electronics 14 by means of a separate signal conductor 22, where the signals from each segment preferably are processed separately. As in FIG. 3, where the anode or cathode electrode constitute the detector electrode, the signal conductors 22 also connects the respective strip to the high voltage DC power supply 7.

This electrode can be used when the energy of each X-ray photon is to be measured, since an X-ray photon having higher energy statistically causes a primary ionization after a longer path through the gas than an X-ray photon of lower energy. By means of this electrode, both the position of X-ray photon interaction and the energy of each X-ray photon can be detected. By statistical methods one can restore the spectrum of the incident photons with very high energy resolution. See for example E. L. Kosarev et al., Nucl. Instr and methods 208 (1983) 637 and G. F. Karabadjak et al., Nucl. Instr and methods 217 (1983) 56.

Generally for all embodiments, each incident X-ray photon causes one induced pulse in one (or more) detector electrode element. The pulses are processed in the processing electronics, which eventually shapes the pulses, and integrates or counts the pulses from each strip (pad or sets of pads) representing one pixel. The pulses can also be processed so as to provide an energy measure for each pixel.

Where the detector electrode is on the cathode side the area of an induced signal is broader (in a direction perpendicular to the direction of incidence of the X-ray photons) than on the anode side. Therefore, weighting of the signals in the processing electronics is preferable.

Figure 5:
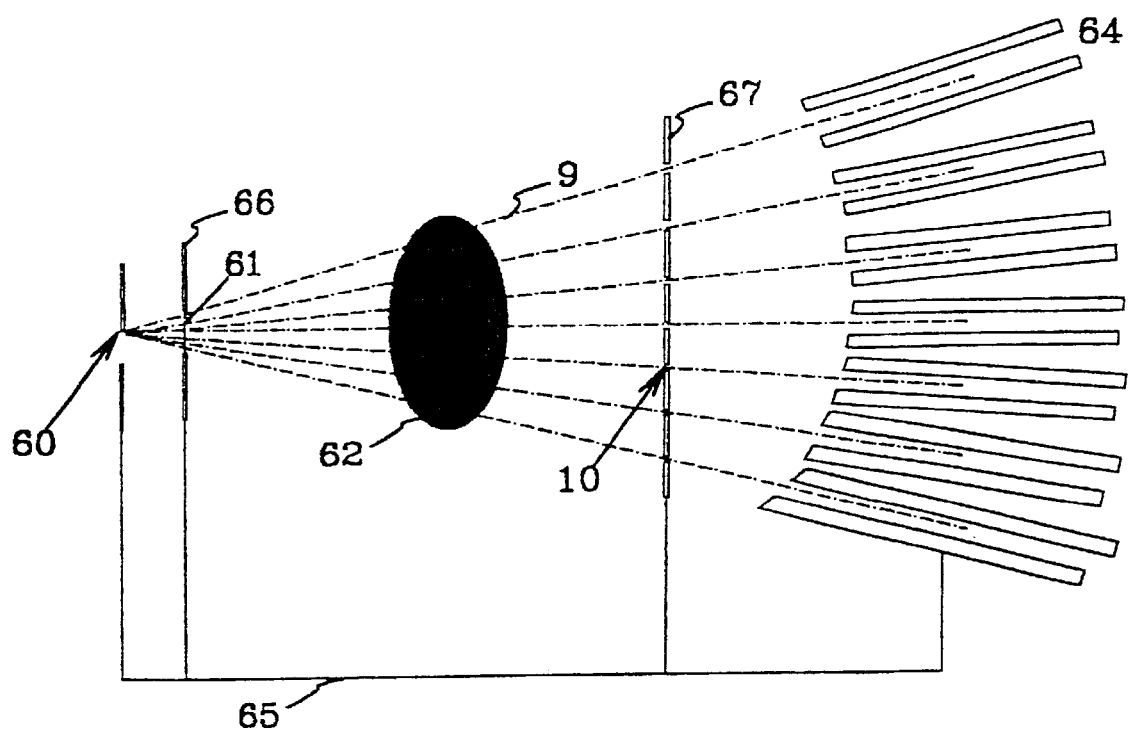
FIG. 5 is a schematic cross sectional view of an embodiment according to the invention, with stacked detectors.

FIG. 5 shows schematically an embodiment of the invention with a plurality of the inventive detectors 64 stacked, one on top of another. By this embodiment a multiline scan can be achieved, which reduces the overall scanning distance, as well as the scanning time. The apparatus of this embodiment includes an X-ray source 60, which together with a number of collimator windows 61 produce a number of planar fan-shaped X-ray beams 9, for irradiation of the object 62 to be imaged. The beams transmitted through the object 62 optionally enter the individual stacked detectors 64 through a number of second collimator windows 10, which are aligned with the X-ray beams. The first collimator windows 61 are arranged in a first rigid structure 66, and the optional second collimator windows 10 are arranged in a second rigid structure 67 attached to the detectors 64, or arranged separately on the detectors.

The X-ray source 60, the rigid structure 66, and the possible structure 67 including collimator windows 61, 10, respectively, and the stacked detectors 64, which are fixed to each other, are connected and fixed in relation to each other by for example a frame or support 65. The so formed apparatus for radiography can be moved as a unit to scan an object, which is to be examined. In this multiline configuration, the scanning can be done in a transverse direction, perpendicular to the X-ray beam, as mentioned above. It can also be advantageous if the apparatus for radiography is fixed and the object to be imaged is moved.

A further advantage of using a stacked configuration, compared to large single volume gas detectors, is reduction of background noise caused by X-ray photons scattered in the object 62. These scattered X-ray photons travelling in directions not parallel to the incident X-ray beam could cause "false" signals or avalanches in one of the other detectors 64 in the stack, if passing through anode and cathode plates and entering such a chamber. This reduction is achieved by significant absorption of (scattered) X-ray photons in the material of the anode and the cathode plates, or the collimator 67.

Figure 6:
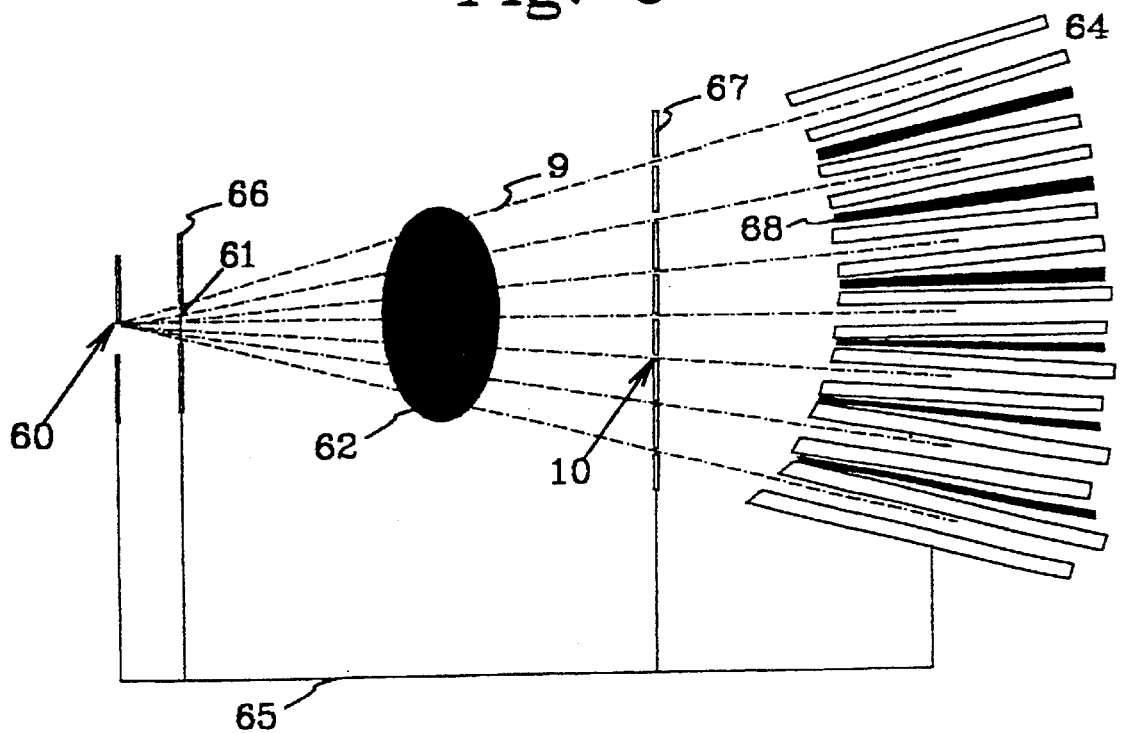
FIG. 6 is a schematic cross sectional view of a further embodiment according to the invention, with stacked detectors.

This background noise can be further reduced by providing thin absorber plates 68 between the stacked detectors 64, as shown in FIG. 6. The stacked detector is similar to that of FIG. 5, with the difference that thin sheets of absorbing material is placed between each adjacent detectors 64. These absorber plates or sheets can be made of a high atomic number material, for example tungsten.

In all embodiments the gas volumes are very thin, which results in a fast removal of ions, which leads to low or no accumulation of space charges. This makes operation at high rate possible.

In all embodiments the small distances lead to low operating voltages, which results in low energy in possible sparks, which is favorable for the electronics.

The focusing of the electric field lines in the embodiments is also favorable for suppressing streamer formations. A streamer is a form of channel of plasma in which a spark can form. This leads to a reduced risk for sparks.

As an alternative for all embodiments, the electric field in the conversion and drift gap (volume) can be kept high enough to cause electron avalanches, hence to be used in a pre-amplification mode.

Although the invention has been described in conjunction with a number of preferred embodiments, it is to be understood that various modifications may still be made without departing from the spirit and scope of the invention, as defined by the appended claims. For example the voltages can be applied in other ways as long as the described electrical fields are created.

What is claimed is:

1. A high position resolution detector for detection of X-rays, comprising:
   a first and a second electrode arranged spaced apart, the space between which being filled with an ionizable gas;
   an electron avalanche amplification electrode arranged between said first and second electrodes or on a level with said second electrode;
   a radiation entrance window oriented such that said X-rays can enter said space between said first electrode and said electron avalanche amplification electrode for ionizing the ionizable gas;
   a power supplying unit for creating an electric field in said space between said first electrode and said electron avalanche amplification electrode for drift of electrons and ions created as a result of said ionization, and an electric field in said space between said electron avalanche amplification electrode and said second electrode for avalanche amplification of said drifted electrons;
   a readout arrangement for detection of said avalanche amplified electrons, wherein
   the space between said first electrode and said electron avalanche amplification electrode defines one single homogenous gas volume; and
   the distance between said first electrode and said electron avalanche amplification electrode is smaller than or equal to a few times the length of electron tracks of short-range electrons released in said space between said first electrode and said electron avalanche amplification electrode subsequent to said ionization.

2. The detector as claimed in claim 1 wherein the distance between said first electrode and said electron avalanche amplification electrode is small enough such that a major portion of long-range electrons released in said space between said first electrode and said electron avalanche amplification electrode subsequent to said ionization are geometrically discriminated.

3. The detector as claimed in claim 1 wherein the distance between said first electrode and said electron avalanche amplification electrode is smaller than the length of electron tracks of short-range electrons released in said space between said first electrode and said electron avalanche amplification electrode subsequent to said ionization.

4. The detector as claimed in claim 1 wherein said short-range electrons are defined as electrons having a kinetic energy of <4 keV.

5. The detector as claimed in claim 1 wherein said short-range electrons are defined as electrons, which will travel a path of <0.1 mm in a gas before being stopped.

6. The detector as claimed in claim 1 wherein said ionizable gas is at a pressure of about 3 atm and said short-range electrons travel a path of <0.1 mm in said ionizable gas before being stopped.

7. The detector as claimed in claim 1 wherein said ionizable gas includes krypton or xenon.

8. The detector as claimed in claim 1 wherein said ionizable gas includes krypton and said short-range electrons are defined as electrons having a kinetic energy of <2 keV.

9. The detector as claimed in claim 1 wherein said ionizable gas includes xenon and said short-range electrons are defined as electrons having a kinetic energy of <5 keV.

10. The detector as claimed in claim 1 wherein said short-range electrons include Auger electrons as being emitted while said ionizable gas relaxes.

11. The detector as claimed in claim 1 wherein the electron tracks of said short-range electrons are defined as tracks of secondary ionized electrons produced by said short-range electrons in said ionizable gas before being stopped.

12. The detector as claimed in claim 1 wherein the distance between said first electrode and said electron avalanche amplification electrode and the distance between said electron avalanche amplification electrode and said second electrode are essentially equally long.

13. The detector as claimed in claim 12 wherein said ionizable gas is at a pressure of 1–20 atm and said equally long distances are 0.05–0.5 mm.

14. The detector as claimed in claim 1 wherein said readout arrangement is provided with a threshold function for electronically discriminating detected avalanche amplified electrons originating from interaction of long-range electrons with said ionizable gas.

15. The detector as claimed in claim 1 wherein said X-rays enter said space as a fan-shaped X-ray beam.

16. The detector as claimed in claim 15 wherein said radiation entrance window is oriented such that said fan-shaped X-ray beam enters sideways between said first electrode and said electron avalanche amplification electrode in a direction substantially perpendicular to the electric field in said space between said first electrode and said electron avalanche amplification electrode.

17. The detector as claimed in claim 16 wherein said readout arrangement includes a number of strips placed side by side.

18. The detector as claimed in claim 17 wherein said readout elements extend in directions parallel to directions of said X-rays.

19. The detector as claimed in claim 17 wherein said readout elements constitute said second electrode.

20. The detector as claimed in claim 19 wherein said electron avalanche amplification electrode includes a number of strips placed side by side arranged on a level with said readout elements, said electron avalanche amplification electrode strips and said readout elements being alternately provided.

21. The detector as claimed in claim 17 wherein said electron avalanche amplification electrode is provided with a plurality of openings to let said drifted electrons pass through.

22. The detector as claimed in claim 21 including a second electron avalanche amplification electrode arranged between said electron avalanche amplification electrode and said second electrode, wherein said power supply unit is adapted to create an electric field between said electron avalanche amplification electrodes for avalanche amplification of said drifted electrons; and said second electron avalanche amplification electrode is provided with a plurality of openings to let said avalanche amplified electrons pass through.

23. A radiographic apparatus for scanning an object including the detector as claimed in claim 17, an X-ray source for providing said X-rays as a fan-shaped X-ray beam, and means for moving said detector and said X-ray source relative to said object.

24. A radiographic apparatus for scanning an object including a plurality of the detector as claimed in claim 17, means for forming a fan-shaped X-ray beam for each detector, and means for moving said plurality of detectors and said means for forming a fan-shaped X-ray beam or each detector relative to said object.

25. A high position resolution detector for detection of X-rays, comprising:

a first and a second electrode arranged spaced apart, the space between which being filled with an ionizable gas;

an electron avalanche amplification electrode arranged between said first and second electrodes or on a level with said second electrode;

a radiation entrance window oriented such that said X-rays can enter said space between said first electrode and said electron avalanche amplification electrode for ionizing the ionizable gas;

a power supply unit for creating an electric field in said space between said first electrode and said electron avalanche amplification electrode for drift of electrons and ions created as a result of said ionization, and an electric field in said space between said electron avalanche amplification electrode and said second electrode for avalanche amplification of said drifted electrons;

a readout arrangement for detection of said avalanche amplified electrons, wherein the space between said first electrode and said electron avalanche amplification electrode defines one single homogenous gas volume; and the distance between said first electrode and said electron avalanche amplification electrode is between 1 and 5 times the length of electron tracks of short-range electrons released in said space between said first electrode and said electron avalanche amplification electrode subsequent to said ionization.

26. The detector as claimed in claim 25 wherein the distance between said first electrode and said electron avalanche amplification electrode is small enough such that a major portion of long-range electrons released in said space between said first electrode and said electron avalanche amplification electrode subsequent to said ionization are geometrically discriminated.

27. The detector as claimed in claim 25 wherein said short-range electrons travel a path of <0.1 mm in said ionizable gas before being stopped.

28. The detector as claimed in claim 25 wherein said ionizable gas includes krypton or xenon.

29. The detector as claimed in claim 25 wherein the electron tracks of said short-range electrons are defined as tracks of secondary ionized electrons produced by said short-range electrons in said ionizable gas before being stopped.

30. The detector as claimed in claim 25 wherein the distance between said first electrode and said electron avalanche amplification electrode and the distance between said electron avalanche amplification electrode and said second electrode are essentially equally long.

31. The detector as claimed in claim 30 wherein said ionizable gas is at a pressure of 1–20 atm and said equally long distances are 0.05–0.5 mm.

32. The detector as claimed in claim 25 wherein said readout arrangement is provided with a threshold function for electronically discriminating detected avalanche amplified electrons originating from interaction of long-range electrons with said ionizable gas.

33. A high position resolution detector for detection of X-rays, comprising:
   a first and a second electrode arranged spaced apart, the space between which being filled with an ionizable gas;
   an electron avalanche amplification electrode arranged between said first and second electrodes or on a level with said second electrode;
   a radiation entrance window oriented such that said X-rays can enter said space between said first electrode and said electron avalanche amplification electrode for ionizing the ionizable gas;
   a power supply unit for creating an electric field in said space between said first electrode and said electron avalanche amplification electrode for drift of electrons and ions created as a result of said ionization, and an electric field in said space between said electron avalanche amplification electrode and said second electrode for avalanche amplification of said drifted electrons;
   a readout arrangement for detection of said avalanche amplified electrons, wherein
   the space between said first electrode and said electron avalanche amplification electrode defines one single homogenous gas volume; and
   the distance between said first electrode and said electron avalanche amplification electrode is a few times the length of electron tracks of short-range electrons released in said space between said first electrode and said electron avalanche amplification electrode subsequent to said ionization.

34. The detector as claimed in claim 33 wherein said short-range electrons travel a path of <0.1 mm in said ionizable gas before being stopped.

35. The detector as claimed in claim 33 wherein said readout arrangement is provided with a threshold function for electronically discriminating detected avalanche amplified electrons originating from interaction of long-range electrons with said ionizable gas.

36. A method for detection of X-rays with high position resolution comprising the steps of:
   entering said X-ray into a space formed between a first electrode and an electron avalanche amplification electrode that are spaced apart, said space being filled with an ionizable gas to constitute one single homogenous gas volume;
   applying an electric field in said space between said first electrode and said electron avalanche amplification electrode for drift of electrons and ions created as a result of ionization of said ionizable gas by said X-rays;
   geometrically discriminating long-range electrons released in said space between said first electrode and said electron avalanche amplification electrode subsequent to said ionization by means of providing said first electrode and said electron avalanche amplification electrode spaced apart with a distance smaller than a few times the length of electron tracks of short-range electrons released in said space between said first electrode and said electron avalanche amplification electrode subsequent to said ionization;
   applying an electric field in a space filled with said ionizable gas and a ranged between said electron avalanche amplification electrode and a third electrode for avalanche amplification of said drifted electrons; and
   detecting said avalanche amplified electrons by means of a readout arrangement.

37. The method as claimed in claim 36 wherein said electron tracks of said short-range electrons are <0.1 mm in said ionizable gas.

38. The method as claimed in claim 36 wherein said ionizable gas includes krypton or xenon.

39. The method as claimed in claim 36 wherein the distance between said first electrode and said electron avalanche amplification electrode and the distance between said electron avalanche amplification electrode and said second electrode are essentially equally long.

40. The method as claimed in claim 36 further comprising the step of electronically discriminating detected avalanche amplified electrons originating from interaction of long-range electrons with said ionizable gas by means of a threshold function provided in said readout arrangement.

41. A method for detection of X-rays with high position resolution comprising the steps of:
   entering said X-rays into a space formed between a first electrode and an electron avalanche amplification electrode that are spaced apart, said space being filled with an ionizable gas to constitute one single homogenous gas volume;
   applying an electric field in said space between said first electrode and said electron avalanche amplification electrode for drift of electrons and ions created as a result of ionization of said ionizable gas by said X-rays;
   geometrically discriminating long-range electrons released in said space between said first electrode and said electron avalanche amplification electrode subsequent to said ionization by means of providing said first electrode and said electron avalanche amplification electrode spaced apart with a distance of a few times the length of electron tracks of short-range electrons released in said space between said first electrode and said electron avalanche amplification electrode subsequent to said ionization;
   applying an electric field in a space filled with said ionizable gas and arranged between said electron avalanche amplification electrode and a third electrode for avalanche amplification of said drifted electrons; and
   detecting said avalanche amplified electrons by means of a readout arrangement.

42. The method as claimed in claim 41 wherein said electron tracks of said short-range electrons are <0.1 mm in said ionizable gas.

43. The method as claimed in claim 41 further comprising the step of electronically discriminating detected avalanche amplified electrons originating from interaction of long-range electrons with said ionizable gas by means of a threshold function provided in said readout arrangement.

44. A method for detection of X-rays with high position resolution comprising the steps of:
   entering said X-rays into a space formed between a first electrode and an electron avalanche amplification electrode that are spaced apart, said space being filled with an ionizable gas to constitute one single homogenous gas volume;
   applying an electric field in said space between said first electrode and said electron avalanche amplification electrode for drift of electrons and ions created as a result of ionization of said ionizable gas by said X-rays;
   geometrically discriminating long-range electrons released in said space between said first electrode and said electron avalanche amplification electrode subsequent to said ionization by means of providing said first electrode and said electron avalanche amplification electrode spaced apart with a distance of between 1 and 5 times the length of electron tracks of short-range electrons released in said space between said first electrode and said electron avalanche amplification electrode subsequent to said ionization;

applying an electric field in a space filled with said ionizable gas and arranged between said electron avalanche amplification electrode and a third electrode for avalanche amplification of said drifted electrons; and detecting said avalanche amplified electrons by means of a readout arrangement.

45. The method as claimed in claim 44 wherein said electron tracks of said short-range electrons are <0.1 mm in said ionizable gas.

46. The method as claimed in claim 44 further comprising the step of electronically discriminating detected avalanche amplified electrons originating from interaction of long-range electrons with said ionizable gas by means of a threshold function provided in said readout arrangement.

* * * * *